(12) United States Patent
Pauwels et al.

(10) Patent No.: US 12,387,465 B2
(45) Date of Patent: Aug. 12, 2025

(54) SYSTEMS AND METHODS FOR LOCATING OBJECTS WITH UNKNOWN PROPERTIES FOR ROBOTIC MANIPULATION

(71) Applicant: Boston Dynamics, Inc., Waltham, MA (US)

(72) Inventors: Karl Pauwels, Redwood City, CA (US); Ran Tao, Milpitas, CA (US)

(73) Assignee: Boston Dynamics, Inc., Waltham, MA (US)

( * ) Notice: Subject to any disclaimer, the term of this patent is extended or adjusted under 35 U.S.C. 154(b) by 260 days.

(21) Appl. No.: 17/987,496

(22) Filed: Nov. 15, 2022

(65) Prior Publication Data

US 2023/0186609 A1 Jun. 15, 2023

Related U.S. Application Data

(60) Provisional application No. 63/288,278, filed on Dec. 10, 2021.

(51) Int. Cl.
*G06F 17/00* (2019.01)
*B25J 9/16* (2006.01)
(Continued)

(52) U.S. Cl.
CPC .......... *G06V 10/774* (2022.01); *B25J 9/1697* (2013.01); *G06V 10/762* (2022.01);
(Continued)

(58) Field of Classification Search
CPC .. G06V 10/774; G06V 10/762; G06V 10/776; G06V 10/82; G06V 20/50; G06V 10/809; G06V 2201/06; B25J 9/1697
(Continued)

(56) References Cited

U.S. PATENT DOCUMENTS 9,938,092 B2 * 4/2018 McMurrough ........ B25J 9/0093
2015/0066199 A1 * 3/2015 Shimono ................ B25J 9/0093
700/218

(Continued)

FOREIGN PATENT DOCUMENTS

CA 2887261 C * 9/2020 ............ B25J 9/1679
EP 4122657 A1 * 1/2023 .............. B25J 9/161
WO WO-2016054656 A1 * 4/2016 .......... B25J 15/0616

OTHER PUBLICATIONS

A calibration strategy for vision-guided robot assembly system of large cabin (Year: 2020).*

(Continued)

*Primary Examiner* — Ronnie M Mancho
(74) *Attorney, Agent, or Firm* — Pierce Atwood LLP

(57) ABSTRACT

Method and apparatus for object detection by a robot are provided. The method comprises analyzing using a set of trained detection models, one or more first images of an environment of the robot to detect one or more objects in the environment of the robot, generating at least one fine-tuned model by training one or more of the trained detection models in the set, wherein the training is based on a second image of the environment of the robot and annotations associated with the second image, wherein the annotations identify one or more objects in the second image, updating the set of trained detection models to include the generated at least one fine-tuned model, and analyzing using the updated set of trained detection models, one or more third images of the environment of the robot to detect one or more objects in the environment.

20 Claims, 11 Drawing Sheets

(51) Int. Cl.
  *G06V 10/762* (2022.01)
  *G06V 10/774* (2022.01)
  *G06V 10/776* (2022.01)
  *G06V 10/82* (2022.01)
  *G06V 20/50* (2022.01)

(52) U.S. Cl.
  CPC ............ *G06V 10/776* (2022.01); *G06V 10/82* (2022.01); *G06V 20/50* (2022.01)

(58) Field of Classification Search
  USPC ........................................................ 700/259
  See application file for complete search history.

(56) References Cited

U.S. PATENT DOCUMENTS

| | | | | |
|---|---|---|---|---|
| 2022/0148119 | A1* | 5/2022 | Yokota | ............... G06T 7/174 |
| 2023/0186609 | A1* | 6/2023 | Pauwels | ............ B25J 9/1697 |
| | | | | 700/259 |
| 2024/0153138 | A1* | 5/2024 | Li | ............................ G06N 3/09 |
| 2024/0202907 | A1* | 6/2024 | Manikani | ............... G06V 10/82 |
| 2024/0248458 | A1* | 7/2024 | Najmark | ............ G05B 19/4155 |

OTHER PUBLICATIONS

International Preliminary Report on Patentability and Written Opinion from the International Bureau for Application No. PCT/US2022/049951, dated Jun. 20, 2024, 8 pages.

International Search Report and Written Opinion of the International Searching Authority for International Application No. PCT/US2022/049951 dated Mar. 20, 2023.

Opaspilai, et al., "Robotic System for Depalletization of Pharmaceutical Products", 7th International Conf. of Engineering, Applied Sciences and Technology (ICEAST), 2021, IEEE, pp. 133-138.

* cited by examiner

SYSTEMS AND METHODS FOR LOCATING OBJECTS WITH UNKNOWN PROPERTIES FOR ROBOTIC MANIPULATION

CROSS REFERENCE TO RELATED APPLICATIONS

This application claims the benefit under 35 U.S.C. § 119(e) of U.S. Provisional application Ser. No. 63/288,278, filed Dec. 10, 2021, and entitled "SYSTEMS AND METHODS FOR LOCATING OBJECTS WITH UNKNOWN PROPERTIES FOR ROBOTIC MANIPULATION," the disclosure of which is incorporated by reference in its entirety.

BACKGROUND

A robot is generally defined as a reprogrammable and multifunctional manipulator designed to move material, parts, tools, or specialized devices through variable programmed motions for a performance of tasks. Robots may be manipulators that are physically anchored (e.g., industrial robotic arms), mobile robots that move throughout an environment (e.g., using legs, wheels, or traction-based mechanisms), or some combination of a manipulator and a mobile robot. Robots are utilized in a variety of industries including, for example, manufacturing, warehouse logistics, transportation, hazardous environments, exploration, and healthcare.

SUMMARY

Certain observable properties (e.g., texture, surface graphics, etc.) of parcels encountered during robotic pick-and-place tasks in logistics scenarios (e.g., depalletizing, truck unloading, order building, etc.) can change over time. For example, new products can be introduced regularly; product packaging can be updated regularly; and certain holidays or seasons can introduce packaging changes. Machine learning models (e.g., deep convolutional neural networks) can be used to locate such parcels for robotic picking. However, these models are typically trained using a dataset that contains only a limited set of parcel appearances, and so these models can fail beyond a certain degree of generalization (e.g., if a parcel's appearance is substantially different from what was provided in the training set). Specific examples of such failures include not detecting parcels, detecting only part of a parcel, and/or detecting multiple parcels as a single parcel. Such failures can prevent the robot from completing (or even starting) the task at hand (e.g., unloading a full truck that contains only a single unknown parcel type).

A conventional approach to extend a model's ability in this regard involves manual data collection, annotation, and model training effort. Because this approach typically requires a lot of time (e.g., weeks), it is not feasible when the robot is in the middle of a pick-and-place operation. In some embodiments, the present technology enables a robot to learn to locate new problematic parcels quickly (e.g., in a matter of minutes), on the basis of only a small dataset (e.g., one image), and using only minimal human intervention. Thus, cycle time (e.g., from problem detection to resolution) can be made sufficiently low to enable the robot to continue completing its task without disturbing business operation.

One aspect of the disclosure provides a method of object detection used by a robotic device to identify one or more objects in an environment of the robotic device. The method comprises receiving, by at least one computing device, one or more first images of an environment of the robotic device, analyzing, by the at least one computing device and using a set of trained detection models, the one or more first images to detect one or more objects in the environment of the robotic device for grasping by the robotic device, generating, by the at least one computing device, at least one fine-tuned model by training one or more of the trained detection models in the set of trained detection models, wherein the training is based on a second image of the environment of the robotic device and annotations associated with the second image, wherein the annotations identify one or more objects in the second image, updating the set of trained detection models to include the generated at least one fine-tuned model, and analyzing, by the at least one computing device and using the updated set of trained detection models, one or more third images of the environment of the robotic device to detect one or more objects in the environment of the robotic device for grasping by the robotic device.

In another aspect, the set of trained detection models includes a plurality of trained neural networks.

In another aspect, the set of trained detection models includes a plurality of models trained on a same set of images and initialized using different parameters.

In another aspect, the method further comprises identifying a detection issue associated with the analysis of the one or more first images by the at least one computing device and using the set of trained detection models, wherein identifying a detection issue comprises determining that an output of at least one first trained detection model in the set of trained detection models differs from an output of at least one second trained detection model in the set of trained detection models, and generating the at least one fine-tuned model is performed when the detection issue is identified.

In another aspect, determining that the output of the at least one first trained detection model differs from the output of the at least one second detection model comprises grouping the outputs of the set of trained detection models using a clustering technique and determining that the output of the at least one first trained detection model is not included in any group generated using the clustering technique.

In another aspect, generating the at least one fine-tuned model comprises generating a plurality of augmented images based on the second image, and training the one or more of the trained detection models in the set of trained detection models based on the plurality of augmented images.

In another aspect, generating the plurality of augmented images comprises generating at least some of the plurality of augmented images during training the one or more of the trained detection models in the set of trained detection models.

In another aspect, generating the plurality of augmented images comprises performing an image manipulation on the second image.

In another aspect, performing an image manipulation includes one or more of zooming, rotating, altering a color space, or altering a brightness or a contrast of the second image to generate each image in the plurality of augmented images.

In another aspect, generating the at least one fine-tuned model comprises training one or more of the trained detection models in the set of trained detection models for a predetermined amount of time.

In another aspect, the predetermined amount of time is one minute or less.

In another aspect, the set of trained detection models includes a first trained detection model and second trained detection model, and generating at least one fine-tuned model comprises generating a first fine-tuned model by training the first trained detection model based on the second image, and generating a second fine-tuned model by training the second trained detection model based on the second image.

In another aspect, updating the set of trained detection models comprises adding to the set of trained detection models, the first fine-tuned model and the second fine-tuned model.

In another aspect, the set of trained detection models includes at least one baseline model and a plurality of fine-tuned models generated based on the at least one baseline model, and the method further comprises generating an aggregated model based, at least in part, on the plurality of fine-tuned models, and adding the aggregated model to the set of trained detection models.

In another aspect, the method further comprises identifying a detection issue associated with the analysis of the one or more first images by the at least one computing device and using the set of trained detection models, and wherein generating the at least one fine-tuned model is performed when the detection issue is identified.

In another aspect, identifying a detection issue comprises identifying the detection issue based, at least in part, on the analysis of the one or more first images.

In another aspect, identifying a detection issue comprises identifying the detection issue based, at least in part, on one or more fourth images captured by the robotic device.

In another aspect, identifying a detection issue comprises identifying the detection issue based, at least in part, on non-visual information provided by a component of the robotic device.

Another aspect of the disclosure provides a mobile robotic device. The mobile robotic device comprises a perception module configured to capture one or more first images of an environment of the robotic device, and at least one computing device. The at least one computing device is configured to analyze using a set of trained detection models, the one or more first images to detect one or more objects in the environment of the robotic device for grasping by the robotic device, generate at least one fine-tuned model by training one or more of the trained detection models in the set of trained detection models, wherein the training is based on a second image and annotations associated with the second image of the environment of the robotic device, wherein the annotations identify one or more objects in the second image, update the set of trained detection models to include the generated at least one fine-tuned model, and analyze using the updated set of trained detection models, one or more third images of the environment of the robotic device to detect one or more objects in the environment of the robotic device for grasping by the robotic device.

In another aspect, the mobile robotic device further comprises a robotic gripper configured to grasp the one or more objects detected in the one or more third images.

In another aspect, the mobile robotic device further comprises a state estimator module configured to detect a state of the robotic device, wherein the at least one computing device is further configured to identify a detection issue based, at least in part, on the state of the robotic device detected by the state estimator module, and wherein generating the at least one fine-tuned model is performed when the detection issue is identified.

Another aspect of the disclosure provides a non-transitory computer-readable medium encoded with a plurality of instructions that, when executed by at least one computing device, perform a method. The method comprises receiving one or more first images of an environment of the robotic device, analyzing using a set of trained detection models, the one or more first images to detect one or more objects in the environment of the robotic device for grasping by the robotic device, generating, by the at least one computing device, at least one fine-tuned model by training one or more of the trained detection models in the set of trained detection models, wherein the training is based on a second image of the environment of the robotic device and annotations associated with the second image, wherein the annotations identify one or more objects in the second image, updating the set of trained detection models to include the generated at least one fine-tuned model, and analyzing using the updated set of trained detection models, one or more third images of the environment of the robotic device to detect one or more objects in the environment of the robotic device for grasping by the robotic device.

Another aspect of the disclosure provides a method of updating a set of trained detection models for a robotic device. The method comprises receiving a single image of an environment of the robotic device and annotations associated with the single image, wherein the annotations identify at least one object in the single image, generating a plurality of augmented images based on the single image, training one of the trained detection models in the set of trained detection models based on the plurality of augmented images to generate a fine-tuned detection model, updating the set of trained detection models to include the generated fine-tuned detection model, and using the updated set of trained detection models to detect one or more objects in the environment of the robotic device.

In another aspect, generating the plurality of augmented images comprises generating at least some of the plurality of augmented images during training the one of the trained detection models in the set of trained detection models.

In another aspect, generating the plurality of augmented images comprises manipulating at least one characteristic of the single image to generate each image in the plurality of augmented images.

In another aspect, the set of trained detection models includes a first trained detection model and second trained detection model, and training one of the trained detection models in the set of trained detection models based on the plurality of augmented images to generate a fine-tuned detection model comprises generating a first fine-tuned model by training the first trained detection model based on the single image, and generating a second fine-tuned model by training the second trained detection model based on the single image.

In another aspect, updating the set of trained detection models comprises adding to the set of trained detection models, the first fine-tuned model and the second fine-tuned model.

In another aspect, training one of the trained detection models in the set of trained detection models based on the plurality of augmented images to generate a fine-tuned detection model comprises training the one of the trained detection models for a predetermined amount of time.

In another aspect, the predetermined amount of time is one minute or less.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figure 1A:
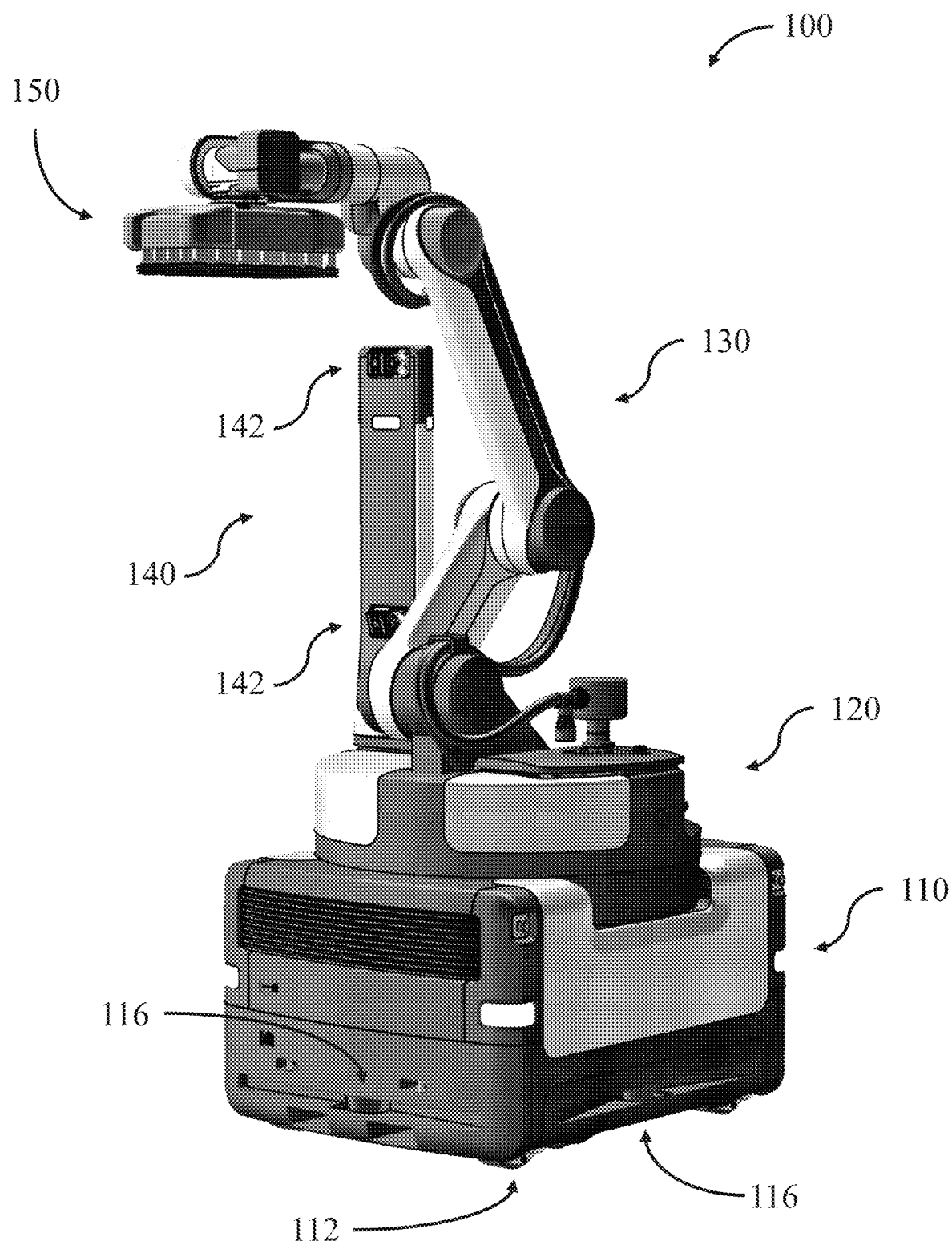
FIG. 1A is a perspective view of one embodiment of a robot.

Robots (also referred to herein as "robotic devices") are typically configured to perform various tasks in an environment in which they are placed. Generally, these tasks include interacting with objects and/or the elements of the environment. Notably, robots are becoming popular in warehouse and logistics operations. Before the introduction of robots to such spaces, many operations were performed manually. For example, a person might manually unload boxes from a truck onto one end of a conveyor belt, and a second person at the opposite end of the conveyor belt might organize those boxes onto a pallet. The pallet may then be picked up by a forklift operated by a third person, who might drive to a storage area of the warehouse and drop the pallet for a fourth person to remove the individual boxes from the pallet and place them on shelves in the storage area. More recently, robotic solutions have been developed to automate many of these functions. Such robots may either be specialist robots (i.e., designed to perform a single task, or a small number of closely related tasks) or generalist robots (i.e., designed to perform a wide variety of tasks). To date, both specialist and generalist warehouse robots have been associated with significant limitations, as explained below.

A specialist robot may be designed to perform a single task, such as unloading boxes from a truck onto a conveyor belt. While such specialist robots may be efficient at performing their designated task, they may be unable to perform other, tangentially related tasks in any capacity. As such, either a person or a separate robot (e.g., another specialist robot designed for a different task) may be needed to perform the next task(s) in the sequence. As such, a warehouse may need to invest in multiple specialist robots to perform a sequence of tasks, or may need to rely on a hybrid operation in which there are frequent robot-to-human or human-to-robot handoffs of objects.

In contrast, a generalist robot may be designed to perform a wide variety of tasks, and may be able to take a box through a large portion of the box's life cycle from the truck to the shelf (e.g., unloading, palletizing, transporting, depalletizing, storing). While such generalist robots may perform a variety of tasks, they may be unable to perform individual tasks with high enough efficiency or accuracy to warrant introduction into a highly streamlined warehouse operation. For example, while mounting an off-the-shelf robotic manipulator onto an off-the-shelf mobile robot might yield a system that could, in theory, accomplish many warehouse tasks, such a loosely integrated system may be incapable of performing complex or dynamic motions that require coordination between the manipulator and the mobile base, resulting in a combined system that is inefficient and inflexible. Typical operation of such a system within a warehouse environment may include the mobile base and the manipulator operating sequentially and (partially or entirely) independently of each other. For example, the mobile base may first drive toward a stack of boxes with the manipulator powered down. Upon reaching the stack of boxes, the mobile base may come to a stop, and the manipulator may power up and begin manipulating the boxes as the base remains stationary. After the manipulation task is completed, the manipulator may again power down, and the mobile base may drive to another destination to perform the next task. As should be appreciated from the foregoing, the mobile base and the manipulator in such systems are effectively two separate robots that have been joined together; accordingly, a controller associated with the manipulator may not be configured to share information with, pass commands to, or receive commands from a separate controller associated with the mobile base. As such, such a poorly integrated mobile manipulator robot may be forced to operate both its manipulator and its base at suboptimal speeds or through suboptimal trajectories, as the two separate controllers struggle to work together. Additionally, while there are limitations that arise from a purely engineering perspective, there are additional limitations that must be imposed to comply with safety regulations. For instance, if a safety regulation requires that a mobile manipulator must be able to be completely shut down within a certain period of time when a human enters a region within a certain distance of the robot, a loosely integrated mobile manipulator robot may not be able to act sufficiently quickly to ensure that both the manipulator and the mobile base (individually and in aggregate) do not a pose a threat to the human. To ensure that such loosely integrated systems operate within required safety constraints, such systems are forced to operate at even slower speeds or to execute even more conservative trajectories than those limited speeds and trajectories as already imposed by the engineering problem. As such, the speed and efficiency of generalist robots performing tasks in warehouse environments to date have been limited.

In view of the above, the inventors have recognized and appreciated that a highly integrated mobile manipulator robot with system-level mechanical design and holistic control strategies between the manipulator and the mobile base may be associated with certain benefits in warehouse and/or logistics operations. Such an integrated mobile manipulator robot may be able to perform complex and/or dynamic motions that are unable to be achieved by conventional, loosely integrated mobile manipulator systems. As a result, this type of robot may be well suited to perform a variety of different tasks (e.g., within a warehouse environment) with speed, agility, and efficiency.

Example Robot Overview

In this section, an overview of some components of one embodiment of a highly integrated mobile manipulator robot configured to perform a variety of tasks is provided to explain the interactions and interdependencies of various subsystems of the robot. Each of the various subsystems, as well as control strategies for operating the subsystems, are described in further detail in the following sections.

Figure 1B:
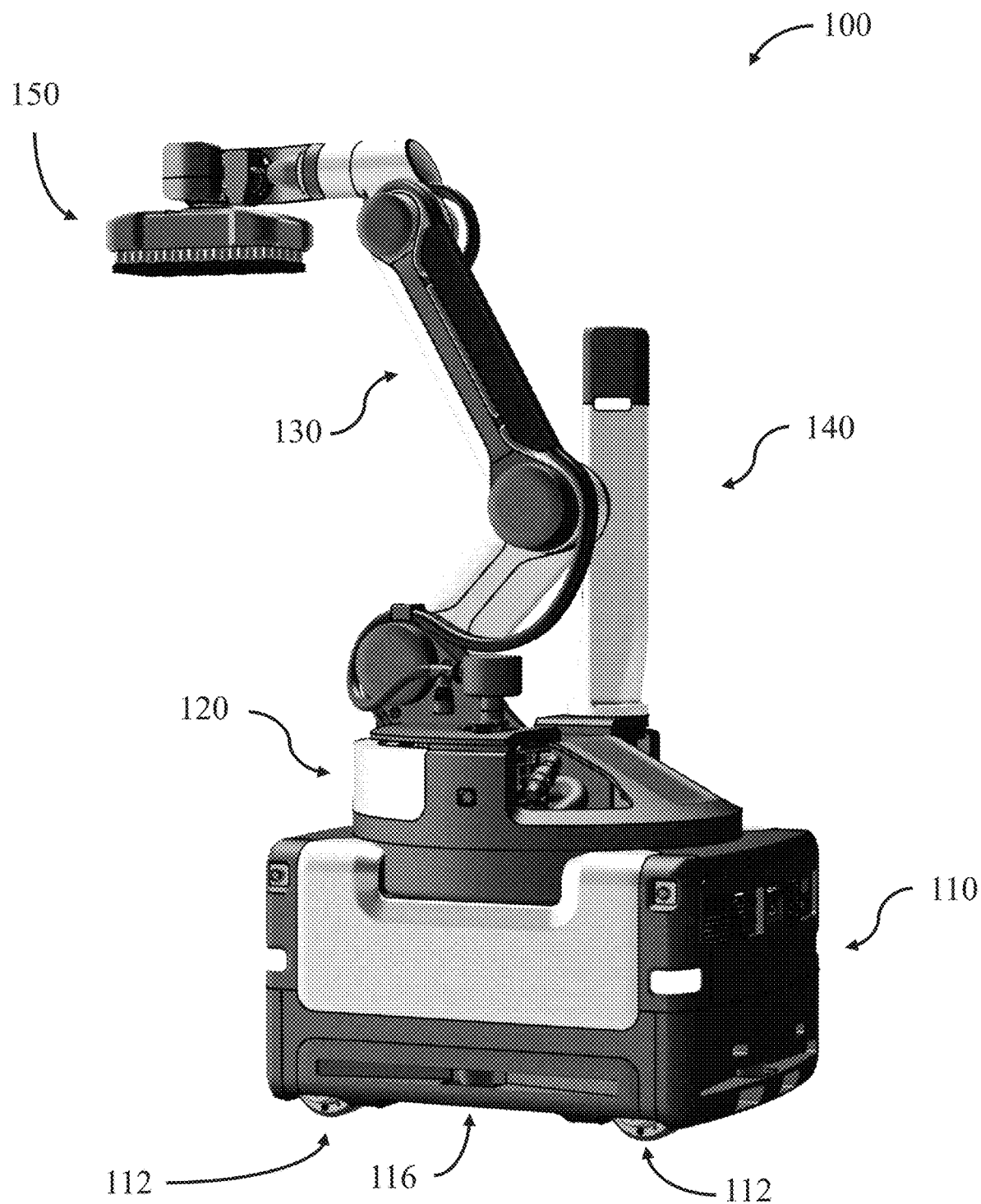
FIG. 1B is another perspective view of the robot of FIG. 1A.

FIGS. 1A and 1B are perspective views of one embodiment of a robot 100. The robot 100 includes a mobile base 110 and a robotic arm 130. The mobile base 110 includes an omnidirectional drive system that enables the mobile base to translate in any direction within a horizontal plane as well as rotate about a vertical axis perpendicular to the plane. Each wheel 112 of the mobile base 110 is independently steerable and independently drivable. The mobile base 110 additionally includes a number of distance sensors 116 that assist the robot 100 in safely moving about its environment. The robotic arm 130 is a 6 degree of freedom (6-DOF) robotic arm including three pitch joints and a 3-DOF wrist. An end effector 150 is disposed at the distal end of the robotic arm 130. The robotic arm 130 is operatively coupled to the mobile base 110 via a turntable 120, which is configured to rotate relative to the mobile base 110. In addition to the robotic arm 130, a perception mast 140 is also coupled to the turntable 120, such that rotation of the turntable 120 relative to the mobile base 110 rotates both the robotic arm 130 and the perception mast 140. The robotic arm 130 is kinematically constrained to avoid collision with the perception mast 140. The perception mast 140 is additionally configured to rotate relative to the turntable 120, and includes a number of perception modules 142 configured to gather information about one or more objects in the robot's environment. The integrated structure and system-level design of the robot 100 enable fast and efficient operation in a number of different applications, some of which are provided below as examples.

Figure 2A:
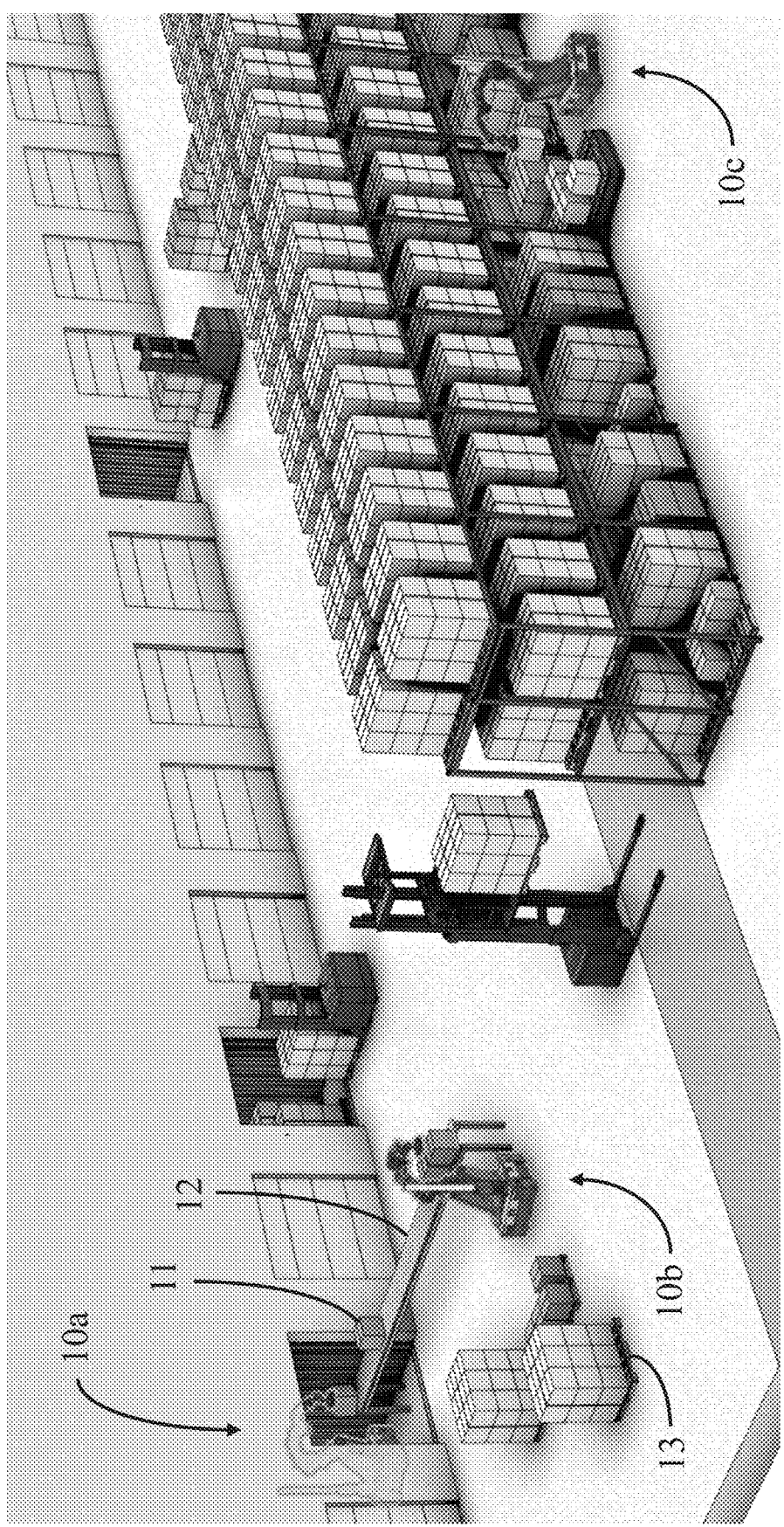
FIG. 2A depicts robots performing tasks in a warehouse environment.

FIG. 2A depicts robots 10a, 10b, and 10c performing different tasks within a warehouse environment. A first robot 10a is inside a truck (or a container), moving boxes 11 from a stack within the truck onto a conveyor belt 12 (this particular task will be discussed in greater detail below in reference to FIG. 2B). At the opposite end of the conveyor belt 12, a second robot 10b organizes the boxes 11 onto a pallet 13. In a separate area of the warehouse, a third robot 10c picks boxes from shelving to build an order on a pallet (this particular task will be discussed in greater detail below in reference to FIG. 2C). It should be appreciated that the robots 10a, 10b, and 10c are different instances of the same robot (or of highly similar robots). Accordingly, the robots described herein may be understood as specialized multi-purpose robots, in that they are designed to perform specific tasks accurately and efficiently, but are not limited to only one or a small number of specific tasks.

Figure 2B:
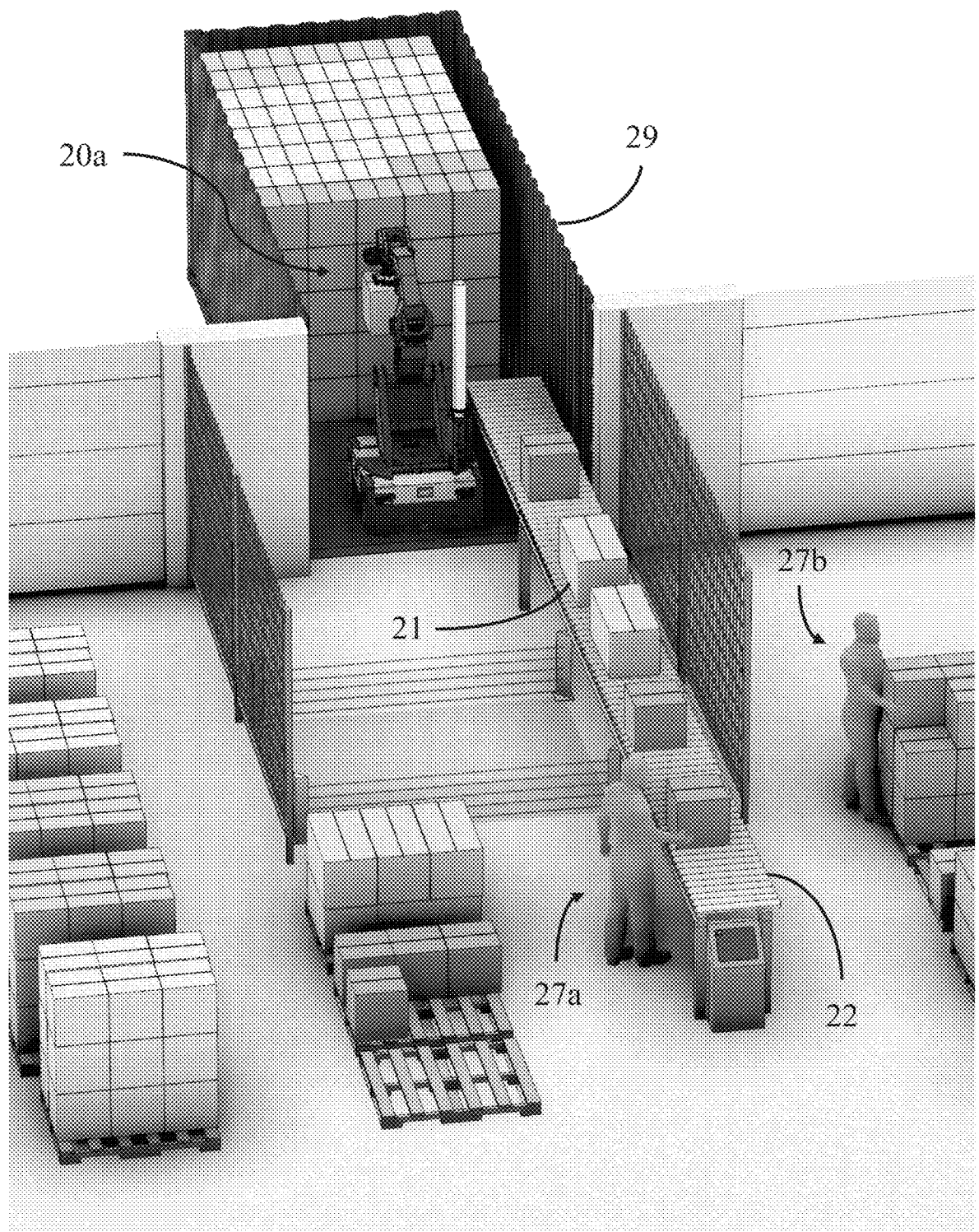
FIG. 2B depicts a robot unloading boxes from a truck.

FIG. 2B depicts a robot 20a unloading boxes 21 from a truck 29 and placing them on a conveyor belt 22. In this box picking application (as well as in other box picking applications), the robot 20a will repetitiously pick a box, rotate, place the box, and rotate back to pick the next box. Although robot 20a of FIG. 2B is a different embodiment from robot 100 of FIGS. 1A and 1B, referring to the components of robot 100 identified in FIGS. 1A and 1B will ease explanation of the operation of the robot 20a in FIG. 2B. During operation, the perception mast of robot 20a (analogous to the perception mast 140 of robot 100 of FIGS. 1A and 1B) may be configured to rotate independent of rotation of the turntable (analogous to the turntable 120) on which it is mounted to enable the perception modules (akin to perception modules 142) mounted on the perception mast to capture images of the environment that enable the robot 20a to plan its next movement while simultaneously executing a current movement. For example, while the robot 20a is picking a first box from the stack of boxes in the truck 29, the perception modules on the perception mast may point at and gather information about the location where the first box is to be placed (e.g., the conveyor belt 22). Then, after the turntable rotates and while the robot 20a is placing the first box on the conveyor belt, the perception mast may rotate (relative to the turntable) such that the perception modules on the perception mast point at the stack of boxes and gather information about the stack of boxes, which is used to determine the second box to be picked. As the turntable rotates back to allow the robot to pick the second box, the perception mast may gather updated information about the area surrounding the conveyor belt. In this way, the robot 20a may parallelize tasks which may otherwise have been performed sequentially, thus enabling faster and more efficient operation.

Also of note in FIG. 2B is that the robot 20a is working alongside humans (e.g., workers 27a and 27b). Given that the robot 20a is configured to perform many tasks that have traditionally been performed by humans, the robot 20a is designed to have a small footprint, both to enable access to areas designed to be accessed by humans, and to minimize the size of a safety zone around the robot into which humans are prevented from entering.

Figure 2C:
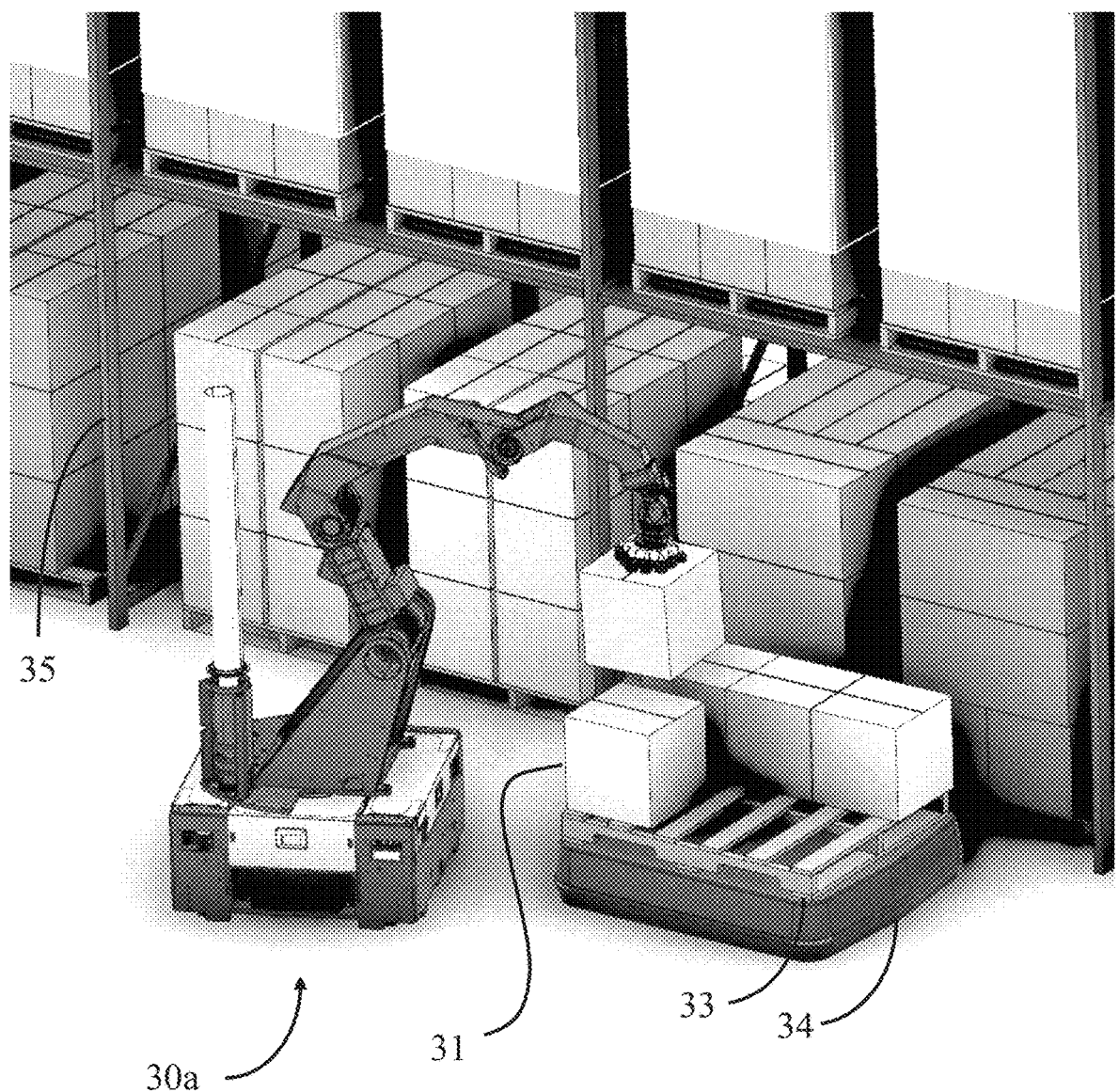
FIG. 2C depicts a robot building a pallet in a warehouse aisle.

FIG. 2C depicts a robot 30a performing an order building task, in which the robot 30a places boxes 31 onto a pallet 33. In FIG. 2C, the pallet 33 is disposed on top of an autonomous mobile robot (AMR) 34, but it should be appreciated that the capabilities of the robot 30a described in this example apply to building pallets not associated with an AMR. In this task, the robot 30a picks boxes 31 disposed above, below, or within shelving 35 of the warehouse and places the boxes on the pallet 33. Certain box positions and orientations relative to the shelving may suggest different box picking strategies. For example, a box located on a low shelf may simply be picked by the robot by grasping a top surface of the box with the end effector of the robotic arm (thereby executing a "top pick"). However, if the box to be picked is on top of a stack of boxes, and there is limited clearance between the top of the box and the bottom of a horizontal divider of the shelving, the robot may opt to pick the box by grasping a side surface (thereby executing a "face pick").

To pick some boxes within a constrained environment, the robot may need to carefully adjust the orientation of its arm to avoid contacting other boxes or the surrounding shelving. For example, in a typical "keyhole problem", the robot may only be able to access a target box by navigating its arm through a small space or confined area (akin to a keyhole) defined by other boxes or the surrounding shelving. In such scenarios, coordination between the mobile base and the arm of the robot may be beneficial. For instance, being able to translate the base in any direction allows the robot to position itself as close as possible to the shelving, effectively extending the length of its arm (compared to conventional robots without omnidirectional drive which may be unable to navigate arbitrarily close to the shelving). Additionally, being able to translate the base backwards allows the robot to withdraw its arm from the shelving after picking the box without having to adjust joint angles (or minimizing the degree to which joint angles are adjusted), thereby enabling a simple solution to many keyhole problems.

Of course, it should be appreciated that the tasks depicted in FIGS. 2A-2C are but a few examples of applications in which an integrated mobile manipulator robot may be used, and the present disclosure is not limited to robots configured to perform only these specific tasks. For example, the robots described herein may be suited to perform tasks including, but not limited to, removing objects from a truck or container, placing objects on a conveyor belt, removing objects from a conveyor belt, organizing objects into a stack, organizing objects on a pallet, placing objects on a shelf, organizing objects on a shelf, removing objects from a shelf, picking objects from the top (e.g., performing a "top pick"), picking objects from a side (e.g., performing a "face pick"), coordinating with other mobile manipulator robots, coordinating with other warehouse robots (e.g., coordinating with AMRs), coordinating with humans, and many other tasks.

Example Computing Device

Control of one or more of the robotic arm, the mobile base, the turntable, and the perception mast may be accomplished using one or more computing devices located onboard the mobile manipulator robot. For instance, one or more computing devices may be located within a portion of the mobile base with connections extending between the one or more computing devices and components of the robot that provide sensing capabilities and components of the robot to be controlled. In some embodiments, the one or more computing devices may be coupled to dedicated hardware configured to send control signals to particular components of the robot to effectuate operation of the various robot systems. In some embodiments, the mobile manipulator robot may include a dedicated safety-rated computing device configured to integrate with safety systems that ensure safe operation of the robot.

The computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the terms "physical processor" or "computer processor" generally refer to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Figure 3:
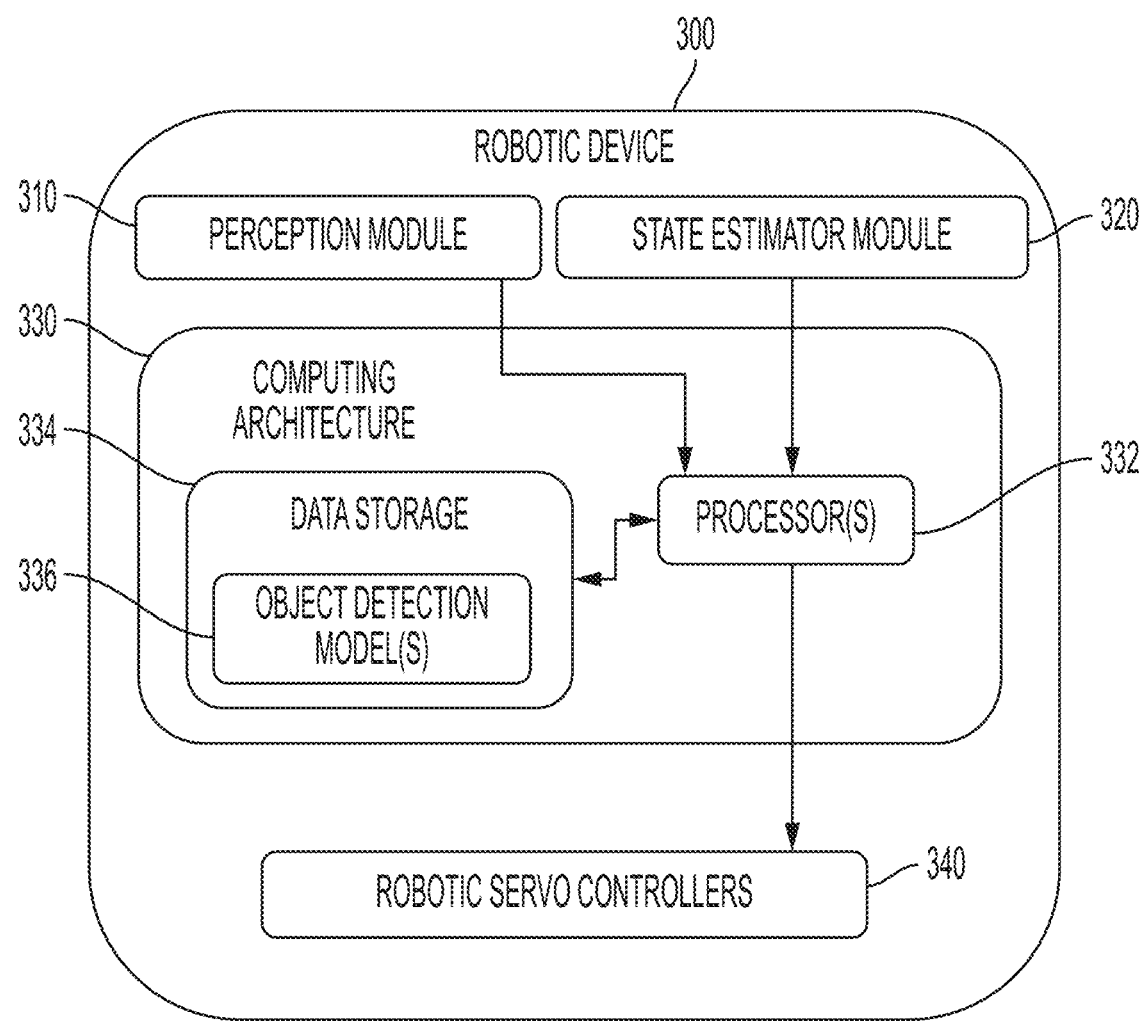
FIG. 3 is an illustrative computing architecture for a robotic device that may be used in accordance with some embodiments.

FIG. 3 illustrates an example computing architecture 310 for a robotic device 300, according to an illustrative embodiment of the invention. The computing architecture 310 includes one or more processors 332 and data storage 334 in communication with processor(s) 332. Robotic device 300 may also include a perception module 310 (which may include, e.g., the perception mast 140 shown and described above in FIGS. 1A-1B) and/or a state estimator module 320 configured to determine a state of one or more portions of the robotic device 300. For instance, state estimator module 320 may be configured to provide non-visual input to indicate an object detection issue, as described in more detail below. One or both of these modules may be configured to provide input to processor(s) 332. For instance, perception module 310 may be configured to provide one or more images to processor(s) 332, which may be programmed to detect one or more objects (e.g., boxes) in the provided one or more images. Data storage 334 may be configured to store one or more object detection models 336 (e.g., one or more trained statistical models) used by processor(s) 332 to analyze the one or more images provided by perception module 310 to detect objects in the image(s). Robotic device 300 may also include robotic servo controllers 340, which may be in communication with processor(s) 332 and may receive control commands from processor(s) 332 to move a corresponding portion (e.g., an arm, the base) of the robotic device.

During operation, perception module 310 can perceive one or more objects (e.g., parcels such as boxes) for grasping (e.g., by an end-effector of the robotic device 300) and/or one or more aspects of the robotic device's environment. In some embodiments, perception module 310 includes one or more sensors configured to sense the environment. For example, the one or more sensors may include, but are not limited to, a color camera, a depth camera, a LIDAR or stereo vision device, or another device with suitable sensory capabilities. In some embodiments, image(s) captured by perception module 310 are processed by processor(s) 332 using trained object detection model(s) 336 to extract surfaces (e.g., faces) of boxes or other objects in the image capable of being grasped by the robotic device 300.

Figure 4:
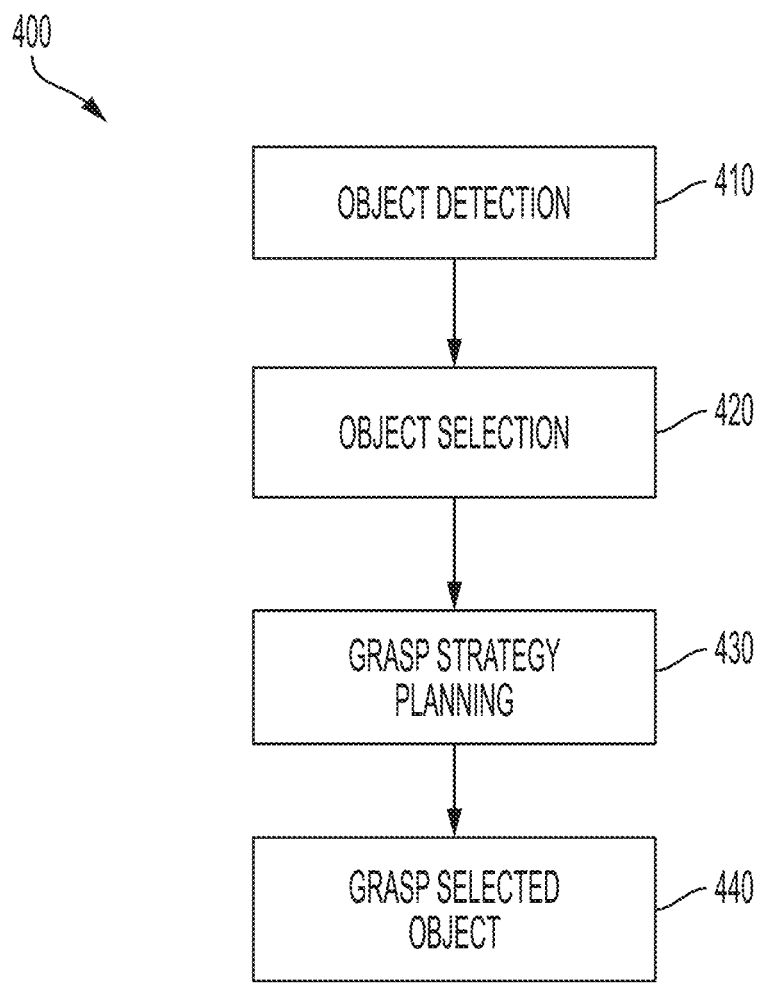
FIG. 4 is a flowchart of a process for detecting and grasping objects by a robotic device in accordance with some embodiments.

FIG. 4 illustrates a process 400 for grasping an object (e.g., a parcel such as a box, package or other object) using an end-effector of a robotic device in accordance with some embodiments. In act 410, objects (e.g., parcels such as boxes or other objects of interest to be grasped by the robotic device) are detected in one or more images (e.g., RGBD images) captured by a perception module of the robotic device. For instance, the one or more images may be analyzed using one or more trained object detection models to detect one or more object faces in the image(s). Following object detection, process 400 proceeds to act 420, where a particular object of the set of detected objects is selected (e.g., to be grasped next by the robotic device). In some embodiments, a set of objects capable of being grasped by the robotic device (which may include all or a subset of objects in the environment near the robot) may be determined as object candidates for grasping. Then, one of the object candidates may be selected as the particular object output from act 420, wherein the selection is based on various heuristics, rules, or other factors that may be dependent on the particular environment and/or the capabilities of the particular robotic device. Process 400 then proceeds to act 430, where grasp strategy planning for the robotic device is performed. The grasp planning strategy may, for example, select, from among multiple possible grasp candidates, a manner in which to grasp the object selected as the output of act 420. Grasp strategy planning may include, but is not limited to, the placement of a gripper of the robotic device on or near a surface of the selected object and one or more movements of the robotic device necessary to achieve such gripper placement on or near the selected object. Process 400 then proceeds to act 440, where the object selected in act 420 is grasped by the robotic device according to the grasp strategy planning determined in act 430.

Figure 5:
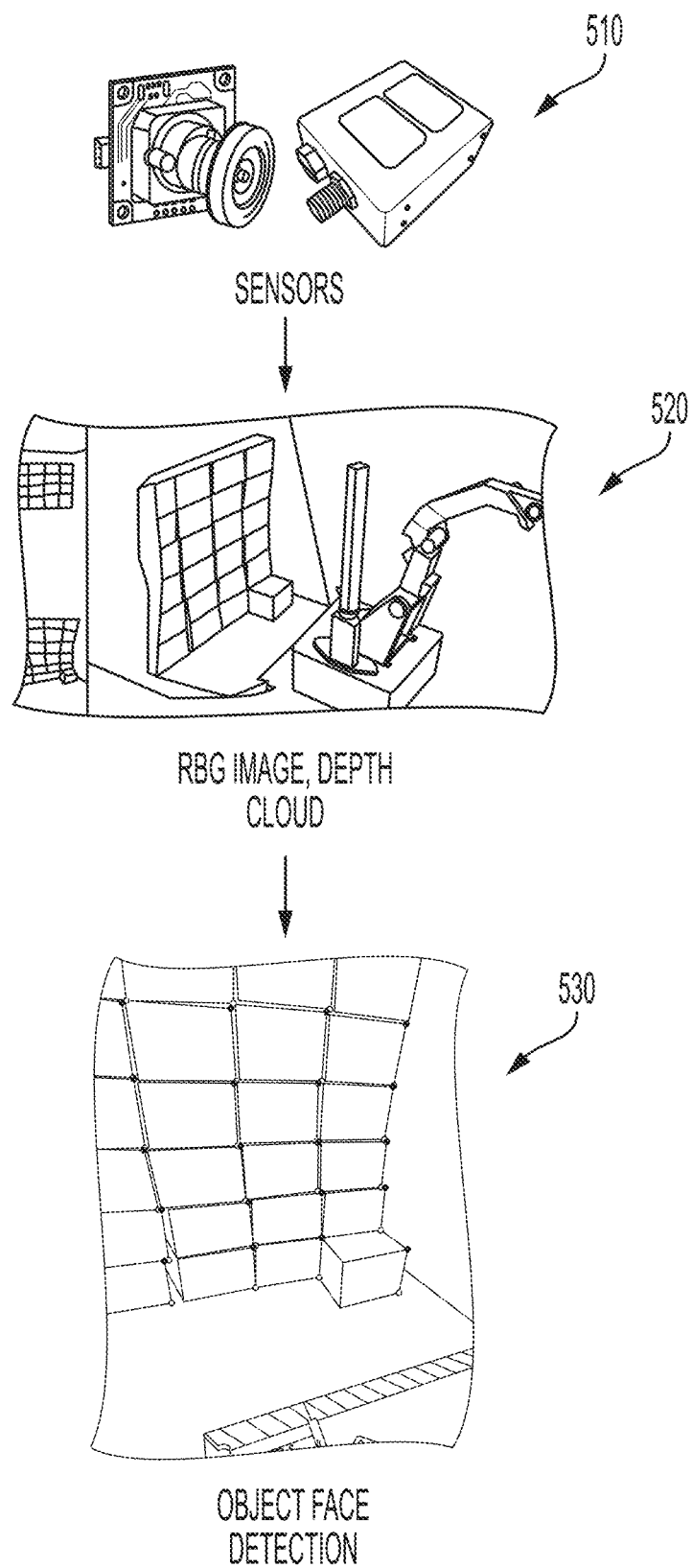
FIG. 5 is a schematic flowchart of a process for detecting objects in an image captured by a perception module of a robotic device in accordance with some embodiments.

FIG. 5 schematically illustrates a process for detecting surfaces of objects in an environment of a robotic device in accordance with some embodiments. As described in connection with FIGS. 1A and 1B, a mobile manipulator robot may include one or more sensors configured to capture information about the environment of the robot. The sensor(s) 510 of the robot may include one or more perception modules that include a color camera (e.g., a red-green-blue (RGB) monocular camera) and a depth sensor (e.g., a time-of-flight (TOF) depth sensor) to determine one or more characteristics of objects (e.g., boxes) in the environment. For instance, an RGB image captured by the color camera and depth information captured by the depth sensor may be combined to generate an RGBD image. The RGBD image may be conceptualized as a high-fidelity colorized 3D point cloud, which includes both color appearance as well as depth data and 3D geometric structure of objects in the environment (shown in FIG. 5 as "RGB Image, Depth Cloud"). In some embodiments, the RGB image and the depth information are combined by registering the RGB image and the depth information to create the RGBD image. As part of the registration process, distortion in one or both of the color image and the depth information caused, for example, by motion of the mobile robot or objects in the environment, may be corrected. Several other factors may additionally or alternatively be taken into account to properly register the RGB image and the depth information. For example, these factors include the intrinsic properties of the cameras (e.g., focal lengths, principal points of the cameras) and the extrinsic properties of the cameras (e.g., the precise position and orientations of the RGB camera and the TOF depth sensor camera with respect to each other). A calibration sequence executed for each set of sensors in a perception module may be performed to determine these intrinsic and extrinsic properties for use in registering the RGB image and the depth information to generate an RGBD image.

Objects in the environment of the robotic device may be determined based on the RGBD image. In some embodiments, the RGBD image is provided as input to a trained statistical model (e.g., a machine learning model) that has been trained to identify one or more characteristics of objects of interest (e.g., boxes). For instance, the statistical model may be trained to recognize surfaces (e.g., faces) of boxes 530 arranged in a stack as shown in FIG. 5. Training data used to train the statistical model may include, for example, a large set of human-annotated images in which the objects of interest have been identified. Any suitable type of trained statistical model may be used to process an RGBD image and output one or more characteristics of object(s) in the environment. In some embodiments, the trained statistical model is implemented as a neural network (e.g., a deep neural network) that includes a plurality of nodes arranged in layers and weights connecting the nodes between the layers. In some embodiments, the neural network is a convolutional neural network, a recurrent neural network, or a combination of types of neural networks.

As discussed above, the neural network (or other statistical model) may be trained on a large set of annotated images depicting objects of different sizes and orientations to produce a "baseline model" that is capable of recognizing object faces in a wide range of environments and object stack scenarios including, but not limited to, objects stacked on one or more shelves in a warehouse, objects stacked in a truck, and objects stacked on a pallet. In the case of a trained neural network, the weights between nodes in the network are learned as a result of the training based on the annotated images. Rather than using a single baseline model for object face recognition, some embodiments employ a plurality of baseline models, each trained using a same training data set, but initialized with different parameters (e.g., different random weights), to further improve the accuracy of the object detection network.

The inventors have recognized that although a trained object (e.g., box) detection network of baseline model(s) may correctly identify some objects (e.g., boxes) with high confidence, in some instances, the trained baseline model(s) may not be able to identify other similar objects with high confidence. For example, new object types that were not included in the training set of images used to train the baseline model(s) may not be recognized by the object detection network that includes the baseline model(s). Some embodiments are directed to updating the set of object detection models to identify new object types.

The inventors have recognized that retraining the baseline model(s) with new images during use of the robot may undesirably result in the robot being unavailable for grasping objects until the training is completed and the updated baseline model(s) can be deployed. To this end, some embodiments are directed to techniques for updating the set of object detection models based on a single image captured by the robot. Quickly updating the set of object detection models "on-the-fly" as a robot is picking objects, as described herein, reduces robot downtime, while improving object detection accuracy, among other benefits.

Example Object Detection Process

Figure 6:
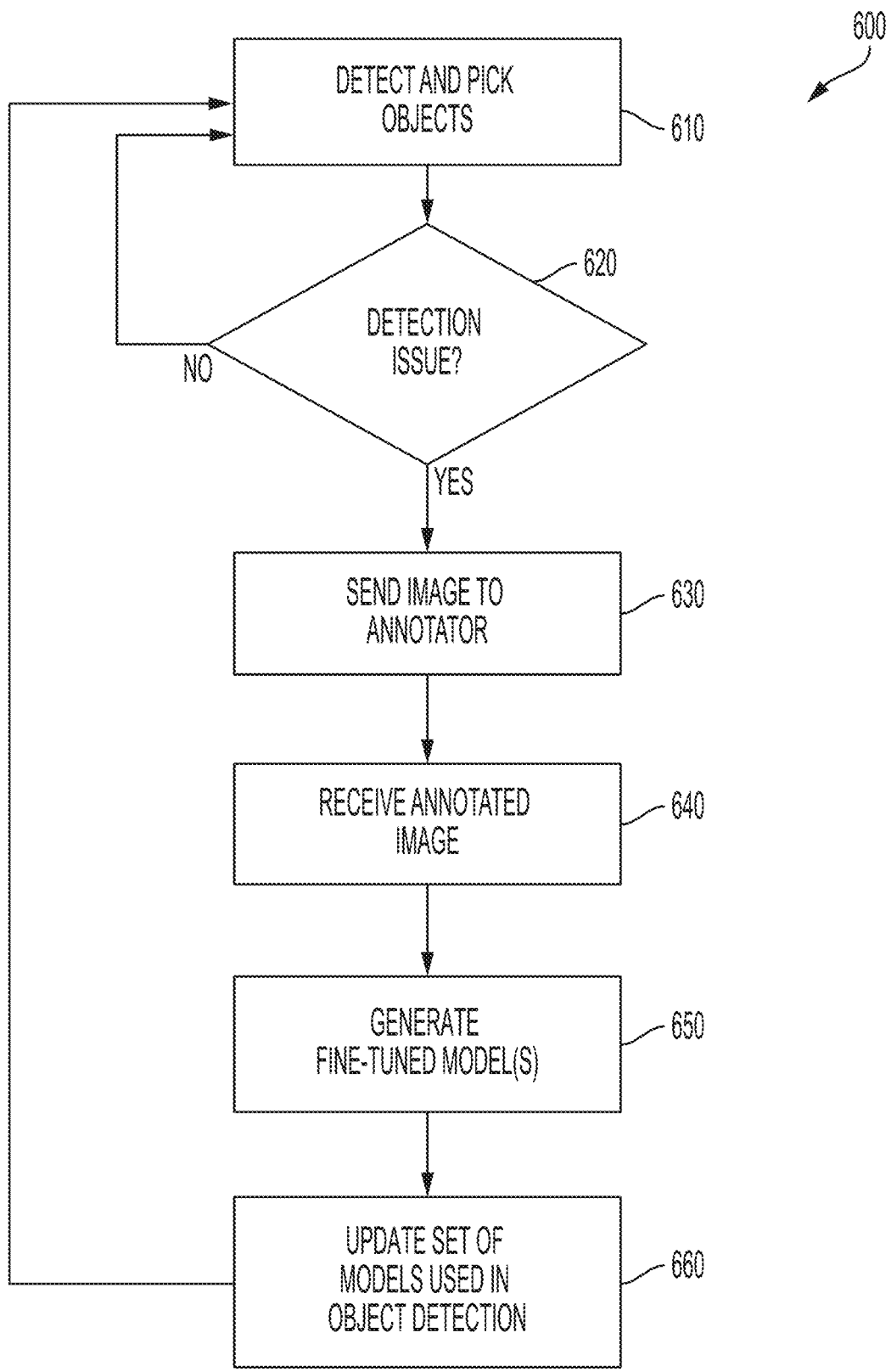
FIG. 6 is a flowchart of a process for updating a set of models used for object detection by a robotic device in accordance with some embodiments.

FIG. 6 illustrates a process 600 for updating a set of models used in object detection by a robotic device in accordance with some embodiments. Process 600 begins in act 610 in which a robotic device is actively detecting and picking objects from a stack of objects. For instance, the robotic device may be located inside of a truck and may actively be unloading boxes from the truck onto a conveyor belt located behind the robotic device. In order to safely and efficiently unload the boxes from the truck, the locations of the boxes in the stack capable of being grasped by the robotic device are identified and one of the boxes is selected from among the candidate boxes for grasping next by the robotic device. For example, the perception module of the robotic device may capture a colorized point cloud representing points detected in an RGBD image as discussed above, and the features of colorized point cloud may be analyzed by the trained baseline model(s) to identify surfaces corresponding to boxes in the image. An example output of the trained statistical model is shown in FIG. 5 in which front faces of identified boxes are represented as squares overlaid on the captured image.

Process 600 then proceeds to act 620, where it is determined whether the object detection network has had difficulty identifying one or more objects (e.g., boxes) in the image. If it is determined in act 620 that there is no detection issue, process 600 returns to act 610 where object detection and picking of objects continues until it is determined in act 620 that a detection issue has occurred. Determining that there is a detection issue in act 620 may be accomplished in any suitable way. For instance, a detection issue may be determined when the set of candidate objects detected using the baseline model(s) includes only a few or no objects despite there being objects present in the image as evidenced by the colorized point cloud captured by the perception module of the robot. In other instances, one or more objects may be detected in the image, but with low confidence, which may result in a determination in act 620 that there is a detection issue.

As discussed above, some embodiments employ a plurality of similar, but different baseline models, each of which may be used to detect objects in an image. When all of the baseline models output similar predictions regarding the detection of objects, it may be determined that the object detection result has high confidence. However, when the prediction output by one (or more) of the baseline models disagrees with the other baseline models, it may be determined that the object detection result has low confidence, and a detection issue may be identified. Other events may additionally or alternatively be used to determine whether there is a detection issue. For instance, in some embodiments, non-visual information detected, for example, by a state estimator module of the robot, is used, at least in part, to determine that there is a detection issue. For example, the state estimator module may determine that the robot is picking objects incorrectly, which may result in a determination that there is a detection issue. Picking objects incorrectly may include, but is not limited to, the robot dropping objects or picking of an object resulting in at least a portion of the stack of objects falling down. Other events that may signify a detection issue include the robot failing to pick objects as can be detected, for example, by the gripper of the robot or on an output conveyor on which objects are being placed by the robot. Repeated failures after multiple pick and place tries by the robot may also indicate a possible detection issue.

When it is determined in act 620 that there is a detection issue, process 600 proceeds to act 630 where a single image is sent to an annotator for annotation of the object faces in the image. The single image sent for annotation may be determined in any suitable way. For instance, the perception module of the robot may be configured to orient its sensors so they are faced directly in front of the stack of objects (e.g., rather than at an angle relative to the stack) to capture the single image. Process 600 then proceeds to act 640 where the annotated single image is received from the annotator. The annotations on the single image may, for example, have the location of one or more of the objects in the image identified, and object faces corresponding to the one or more objects may be determined based on the annotations.

The inventors have recognized that using the annotated image to retrain the baseline model(s) and then using the retrained baseline model to recognize the new object type may have some disadvantages compared with creating one or more new "fine-tuned" models and then using both the previously-trained baseline model(s) and the fine-tuned model(s) to recognize objects in the image. For instance, training the baseline model with the single annotated image may result in the output of the baseline model becoming unstable due to the model being forced to learn a very specific object type based on the single annotated image. Additionally, retraining the baseline model(s) may be a slow process resulting in robot downtime, as described above. To reduce such behavior, process 600 proceeds to act 650 where a new fine-tuned model is generated by training one or more of the baseline models based on the single annotated image. Example processes for generating a fine-tuned model in accordance with some embodiments are described further with reference to FIG. 7. After generation of one or more fine-tuned models, process 600 proceeds to act 660, where the set of object detection models is updated to include the fine-tuned model(s) generated in act 650. Process 600 then returns to act 610, where detection and picking of objects in the environment of the robot continues.

Figure 7:
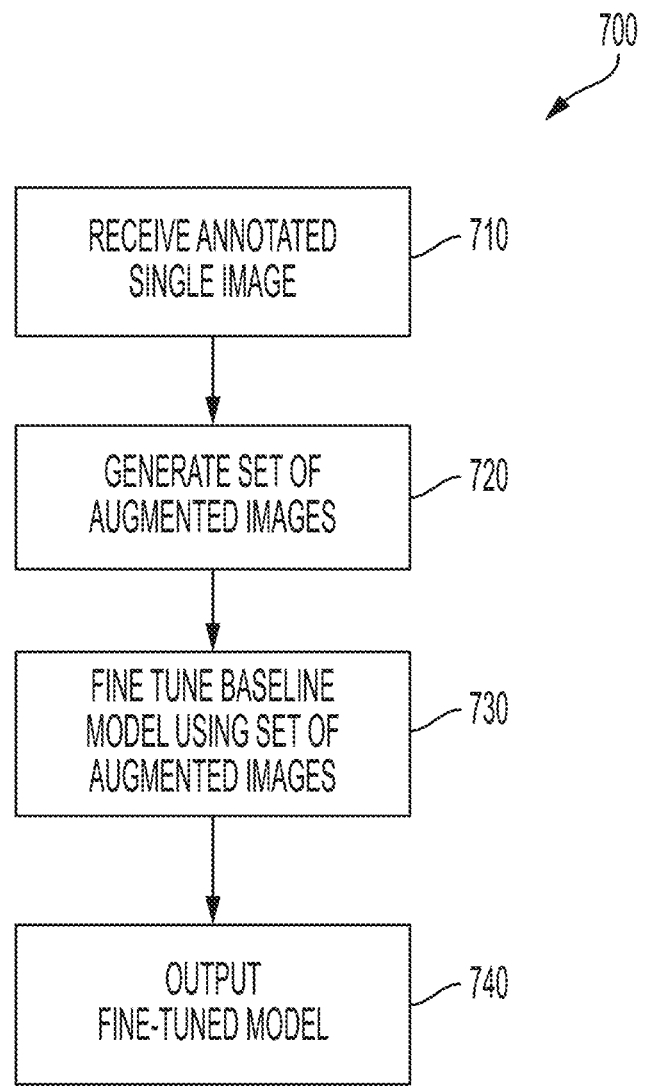
FIG. 7 is a flowchart of a process for generating a fine-tuned object detection model based on a single annotated image in accordance with some embodiments.

FIG. 7 illustrates a process 700 for generating a fine-tuned object detection model in accordance with some embodiments. In act 710, a single annotated image is received (e.g., from an annotator as described in connection with act 640 of process 600). Process 700 then proceeds to act 720, where a set of augmented images is generated based on the single annotated image received in act 710. For instance, the single annotated image may be augmented or transformed by applying one or more image manipulations to the image. Such image manipulations may include, but are not limited to, zooming the image, rotating the image and changing a contrast and/or brightness of the image. Process 700 then proceeds to act 730, where the set of augmented images is used to train a baseline model to generate a fine-tuned model which is stored separately from the baseline model. The newly-created fine-tuned model is output in act 740. In some instances, the augmented images (along with their corresponding annotations) are generated contemporaneously with the training of the fine-tuned model to accelerate the training process. As discussed above, one of the difficulties with retraining models on-the-fly is that the process may take a long time. In some embodiments, training a fine-tuned model using the techniques described herein can be accomplished in approximately a few minutes, one minute, or faster, based on the set of augmented images generated from a single annotated image. In some embodiments, completion of the fine-tuned training is determined based, at least in part, on a validation set of augmented images generated from the single image, which are not part of the training data set used to generate the fine-tuned model.

As described in connection with process 600 of FIG. 6, the output fine-tuned model may be added to the set of object detection models used for further picking of objects in the environment of the robot. In some embodiments, rather than using a single fine-tuned model, a set of similar, but slightly different fine-tuned models (for instance a set of fine-tuned models each of which is trained from a separate instance of a baseline model from a set of similar, but slightly different baseline models) may be created and added to set of object detection models. Use of multiple similar fine-tuned models may be advantageous to be able to assess a measure of certainty within the set of fine-tuned models when the fine-tuned models are used for object detection.

In some embodiments, multiple fine-tuned models (e.g., generated throughout a day or the past few days) may be aggregated into a single aggregated fine-tuned model that is added to the set of object detection models used for object detection by the robot. For instance, aggregation of fine-tuned models may be accomplished by training the aggregated model for a longer period of time than is used for generation of the individual fine-tuned models and training the aggregated model on the different images (e.g., of different object types) used to train each of the fine-tuned models. In some embodiments, the aggregation of multiple fine-tuned models may be performed in the background during operation of the robot to detect and pick objects. In some embodiments, one or more of the fine-tuned models may be removed from the set of object detection models, for example, after a certain number of days, if, for example, the robot starts picking in a new environment, or for any other reason, such as the baseline models having been trained using a more extensive training dataset that includes the new object type.

Figure 8A:
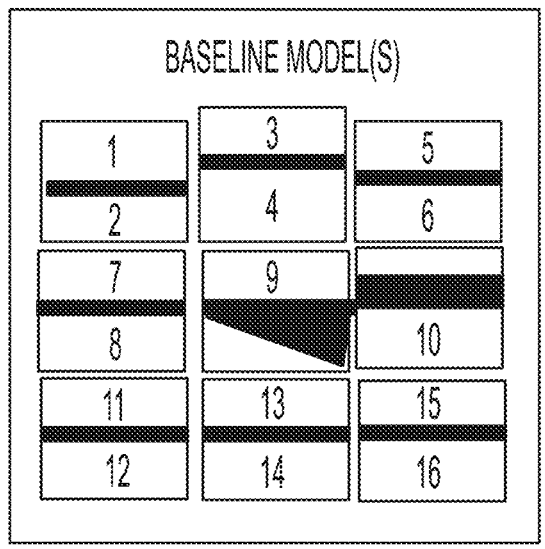
FIGS. 8A-8C show results of an object detection process in which the object detection models used to detect objects by a robot have been updated to including a fine-tuned model based on an annotated image in accordance with some embodiments.
Figure 8B:
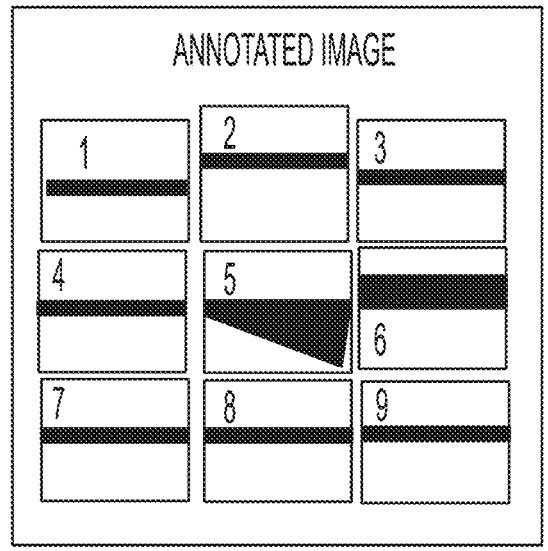
Figure 8C:
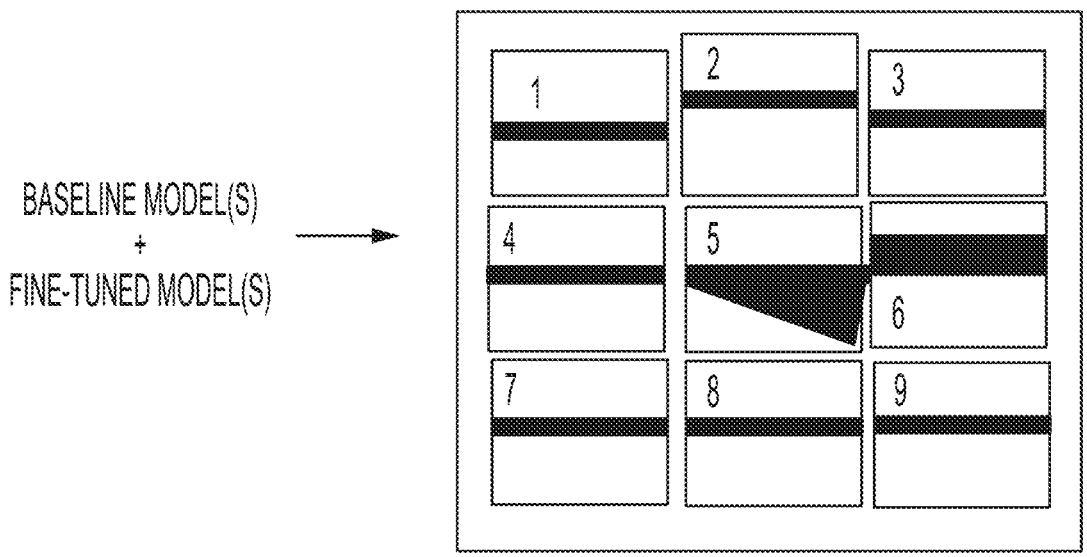

FIGS. 8A-8C show results of a process for detecting objects (e.g., boxes) in an image captured by a mobile manipulator robot in accordance with some embodiments. FIG. 8A shows the output of a baseline object detection network in which some, but not all of the objects (e.g., boxes) in a stack are correctly identified. In this particular example, tape placed near the midline of the objects (shown as dark stripes in the image) in the stack has caused the baseline object detection network to identify multiple skinny objects rather than fewer larger objects. FIG. 8B shows an annotated single image that correctly identifies the location of larger objects in the image. The annotated single image is used to generate a set of training images, which is then used to generate a fine-tuned model as described herein. After generation of the fine-tuned model, it is added to the set of models used for object detection by the robotic device. The result of using the fine-tuned model(s) in combination with the baseline model(s) is shown in FIG. 8C in which the nine larger objects in the stack have now been correctly identified in the image.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. Additionally, or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware or with one or more processors programmed using microcode or software to perform the functions recited above.

In this respect, it should be appreciated that embodiments of a robot may include at least one non-transitory computer-readable storage medium (e.g., a computer memory, a portable memory, a compact disk, etc.) encoded with a computer program (i.e., a plurality of instructions), which, when executed on a processor, performs one or more of the above-discussed functions. Those functions, for example, may include control of the robot and/or driving a wheel or arm of the robot. The computer-readable storage medium can be transportable such that the program stored thereon can be loaded onto any computer resource to implement the aspects of the present invention discussed herein. In addition, it should be appreciated that the reference to a computer program which, when executed, performs the above-discussed functions, is not limited to an application program running on a host computer. Rather, the term computer program is used herein in a generic sense to reference any type of computer code (e.g., software or microcode) that can be employed to program a processor to implement the above-discussed aspects of the present invention.

Various aspects of the present invention may be used alone, in combination, or in a variety of arrangements not specifically discussed in the embodiments described in the foregoing and are therefore not limited in their application to the details and arrangement of components set forth in the foregoing description or illustrated in the drawings. For example, aspects described in one embodiment may be combined in any manner with aspects described in other embodiments.

Also, embodiments of the invention may be implemented as one or more methods, of which an example has been provided. The acts performed as part of the method(s) may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting.

What is claimed is:

1. A method of object detection used by a robotic device to identify one or more objects in an environment of the robotic device, the method comprising:
    receiving, by at least one computing device, one or more first images of an environment of the robotic device;
    analyzing, by the at least one computing device and using a set of trained detection models, the one or more first images to detect one or more objects in the environment of the robotic device for grasping by the robotic device;

generating, by the at least one computing device, at least one fine-tuned model by training one or more of the trained detection models in the set of trained detection models, wherein the training is based on a second image of the environment of the robotic device and annotations associated with the second image, wherein the annotations identify one or more objects in the second image;

updating the set of trained detection models to include the generated at least one fine-tuned model; and analyzing, by the at least one computing device and using the updated set of trained detection models, one or more third images of the environment of the robotic device to detect one or more objects in the environment of the robotic device for grasping by the robotic device.

2. The method of claim 1, wherein the set of trained detection models includes a plurality of trained neural networks.

3. The method of claim 1, wherein the set of trained detection models includes a plurality of models trained on a same set of images and initialized using different parameters.

4. The method of claim 3, further comprising:
identifying a detection issue associated with the analysis of the one or more first images by the at least one computing device and using the set of trained detection models, wherein identifying a detection issue comprises determining that an output of at least one first trained detection model in the set of trained detection models differs from an output of at least one second trained detection model in the set of trained detection models, and wherein generating the at least one fine-tuned model is performed when the detection issue is identified.

5. The method of claim 4, wherein determining that the output of the at least one first trained detection model differs from the output of the at least one second detection model comprises grouping the outputs of the set of trained detection models using a clustering technique and determining that the output of the at least one first trained detection model is not included in any group generated using the clustering technique.

6. The method of claim 1, wherein generating the at least one fine-tuned model comprises:
generating a plurality of augmented images based on the second image; and
training the one or more of the trained detection models in the set of trained detection models based on the plurality of augmented images.

7. The method of claim 6, wherein generating the plurality of augmented images comprises generating at least some of the plurality of augmented images during training the one or more of the trained detection models in the set of trained detection models.

8. The method of claim 6, wherein generating the plurality of augmented images comprises performing an image manipulation on the second image.

9. The method of claim 1, wherein generating the at least one fine-tuned model comprises training one or more of the trained detection models in the set of trained detection models for a predetermined amount of time.

10. The method of claim 1, wherein the set of trained detection models includes a first trained detection model and second trained detection model, and wherein generating at least one fine-tuned model comprises:
generating a first fine-tuned model by training the first trained detection model based on the second image; and
generating a second fine-tuned model by training the second trained detection model based on the second image.

11. The method of claim 10, wherein updating the set of trained detection models comprises adding to the set of trained detection models, the first fine-tuned model and the second fine-tuned model.

12. The method of claim 1, wherein the set of trained detection models includes at least one baseline model and a plurality of fine-tuned models generated based on the at least one baseline model, and wherein the method further comprises:
generating an aggregated model based, at least in part, on the plurality of fine-tuned models; and
adding the aggregated model to the set of trained detection models.

13. The method of claim 1, further comprising identifying a detection issue associated with the analysis of the one or more first images by the at least one computing device and using the set of trained detection models, and wherein generating the at least one fine-tuned model is performed when the detection issue is identified.

14. The method of claim 13, wherein identifying a detection issue comprises identifying the detection issue based, at least in part, on the analysis of the one or more first images.

15. The method of claim 13, wherein identifying a detection issue comprises identifying the detection issue based, at least in part, on one or more fourth images captured by the robotic device.

16. The method of claim 13, wherein identifying a detection issue comprises identifying the detection issue based, at least in part, on non-visual information provided by a component of the robotic device.

17. A mobile robotic device, comprising:
a perception module configured to capture one or more first images of an environment of the robotic device; and
at least one computing device configured to:
analyze using a set of trained detection models, the one or more first images to detect one or more objects in the environment of the robotic device for grasping by the robotic device;
generate at least one fine-tuned model by training one or more of the trained detection models in the set of trained detection models, wherein the training is based on a second image and annotations associated with the second image of the environment of the robotic device, wherein the annotations identify one or more objects in the second image;
update the set of trained detection models to include the generated at least one fine-tuned model; and
analyze using the updated set of trained detection models, one or more third images of the environment of the robotic device to detect one or more objects in the environment of the robotic device for grasping by the robotic device.

18. The robotic device of claim 17, further comprising:
a robotic gripper configured to grasp the one or more objects detected in the one or more third images.

19. The robotic device of claim 17, further comprising:
a state estimator module configured to detect a state of the robotic device, wherein the at least one computing device is further configured to identify a detection issue based, at least in part, on the state of the robotic device detected by the state estimator module, and wherein generating the at least one fine-tuned model is performed when the detection issue is identified.

20. A non-transitory computer-readable medium encoded with a plurality of instructions that, when executed by at least one computing device, perform a method, the method comprising:

receiving one or more first images of an environment of a robotic device;

analyzing using a set of trained detection models, the one or more first images to detect one or more objects in the environment of the robotic device for grasping by the robotic device;

generating, by the computing device, at least one fine-tuned model by training one or more of the trained detection models in the set of trained detection models, wherein the training is based on a second image of the environment of the robotic device and annotations associated with the second image, wherein the annotations identify one or more objects in the second image;

updating the set of trained detection models to include the generated at least one fine-tuned model; and analyzing using the updated set of trained detection models, one or more third images of the environment of the robotic device to detect one or more objects in the environment of the robotic device for grasping by the robotic device.

* * * * *